United States Patent [19]

Okano et al.

[11] Patent Number: 4,547,289

[45] Date of Patent: Oct. 15, 1985

[54] FILTRATION APPARATUS USING HOLLOW FIBER MEMBRANE

[75] Inventors: Yoshihiro Okano, 238-21 Okada, Mabi-cho, Kibi-gun, Japan, 710-11; Takehiko Okamoto, 1660 Sakazu; Akio Ohmory, 1497-25 Mizue, both of Kurashiki-city, Japan, 710

[73] Assignees: Yoshihiro Okano, Kibi; Takehiko Okamoto; Akio Ohmory, both of Kurashiki, all of Japan

[21] Appl. No.: 584,118

[22] Filed: Feb. 27, 1984

[30] Foreign Application Priority Data

Feb. 28, 1983 [JP] Japan ............................... 58-33302
Sep. 24, 1983 [JP] Japan ............................... 58-176811

[51] Int. Cl.⁴ ............................................. B01D 31/00
[52] U.S. Cl. ................................. 210/652; 210/433.2; 210/442
[58] Field of Search .................... 210/321.1, 444, 442, 210/491, 433.2, 652

[56] References Cited

U.S. PATENT DOCUMENTS

| | | | |
|---|---|---|---|
| 3,228,527 | 1/1966 | McPherson | 210/444 X |
| 3,246,764 | 4/1966 | McCormack | 210/321.1 |
| 3,442,389 | 5/1969 | Mendelson | 210/491 X |
| 3,456,805 | 7/1969 | Jarvis et al. | 210/321.1 |
| 3,503,515 | 3/1970 | Tomsic | 210/321.1 |

Primary Examiner—Frank Spear
Attorney, Agent, or Firm—Barry Kramer

[57] ABSTRACT

A filtration apparatus for removing undesirable components from a solution to be treated, comprises a module in which a number of hollow fibers are fixed at one end thereof by cast-molding materials, and is opened at the end portion above described and closed at another end portion thereof, in which said solution to be treated can be kept from leaking out of a mechanically sealed portion. Any defect in the sealed portion can be detected from the outside by the provision of an opening which leads the leaked solution to the outside of the apparatus, instead of allowing it to combine with the filtrate. The apparatus is preferably used for the manufacture of purified water which is free from bacteria, pyrogene, and the like. Ultra-purified water of remarkably high purity can be obtained when the apparatus is used as a check filter in a process for manufacturing ultra-purified water.

11 Claims, 17 Drawing Figures

FILTRATION APPARATUS USING HOLLOW FIBER MEMBRANE

BACKGROUND OF THE INVENTION

1. Field of the Invention

The present invention relates to a filtration apparatus comprising semipermeable hollow fibers sealed at one end thereof. A solution to be treated can either be fed to the outside of the hollow fibers and extracted from the inside of the hollow fibers, or fed to the inside of the hollow fibers and extracted from the outside of the hollow fibers in order to remove undesirable components from the solution. The invention relates more particularly to an apparatus in which a bundle of hollow fibers can be simply replaced when they deteriorate or become clogged or destroyed. The present apparatus allows purified water containing no bacteria, pyrogene, or the like to be obtained over a long period of operation.

The invention is described below in connection with an example of an apparatus for purifying water in which undesirable components (such as bacteria) are removed from the untreated water. The apparatus of the present invention can be used for the concentration, purification and recovery of fruit juice, protein and saccharoid, the filtration of aqueous solutions and organic liquids or the treatment of industrial waste water.

2. Description of the Prior Art

A distillation method and a membrane filtration method are known as methods for manufacturing purified water free of bacteria, pyrogene and the like. However, the distillation method has the disadvantages that water purity is reduced by contamination resulting from splashes and bubbles, and contamination also results from dissolution of the materials of the apparatus by heating or other causes.

In the membrane filtration method, although theoretically both bacteria and pyrogene would be removed almost entirely if a membrane which can reject bacteria and pyrogene is used, the treated liquid (hereinafter referred to as "a filtrate") is frequently contaminated with bacteria and pyrogene. In particular, the liquid is often contaminated in extended filtration. The following causes for such contamination are postulated: (1) the membrane itself produces defects; (2) the membrane is incompletely fixed by case molding materials at one end thereof; and (3) the liquid to be treated (hereinafter referred to as "original liquid") leaks into the filtrate because of incomplete sealing of the mechanical sealing materials, such as O-rings, used in the apparatus. Since the quantity of the untreated liquid which leaks into the filtrate is generally very small, it is extremely difficult to find the causes and routes of the contamination. Even if just one bacterium leaks into a filtrate, this bacterium immediately multiplies in the filtrate, thereby contaminating it. In the manufacture of purified water, leakage of original water into the filtrate must be strictly avoided.

Although the leakage of original water into the filtrate from hollow fibers, and from the portions where hollow fibers are collected and fixed rarely occurs as a result of recent rapid advances in the research of membranes (e.g. selective-permeable membranes), leakage of the original water into the filtrate from the mechanical sealing portions of the apparatus is still unsolved. In particular, in an in-line type of filtration apparatus, where an inlet for original water and an outlet for filtrate are arranged in a straight line (a structure which provides easy installation and operation as well as compactness and easy detachability of a bundle of hollow fibers and the like), any leakage of original water from the outside into the filtrate, even from defects in said mechanical sealing portions, cannot be detected. In addition, even though it can be ascertained from a bacterial test of the filtrate that original water has leaked into the filtrate, leakage from mechanically sealing portions cannot presently be distinguished from leakage resulting from defects in the bundle of hollow fibers.

SUMMARY OF THE INVENTION

It is an object of the present invention to provide a filtration apparatus where leakage of the original water into a filtrate from mechanical sealing portions of the apparatus can be prevented, and a filtrate free from bacteria and pyrogene can therefore be obtained over a long operating time.

It is another object of the present invention to provide a filtration apparatus in which original water leaking out from defects in the mechanical sealing portions does not flow into the filtrate, but instead is led out of the apparatus so that defects in the mechanical sealing portions can be identified by an operator from the outside.

It is a further object of the present invention to provide a filtration apparatus capable of being rapidly and easily prepared by utilizing a pipe line in which a bundle of hollow fibers, preassembled in the form of a module, can rapidly be exchanged even by unskilled personnel.

DETAILED DESCRIPTION OF THE PREFERRED EMBODIMENTS

A preferred embodiment of a filtration apparatus according to the present invention is described below with reference to the drawings. There are two types of apparatus according to the present invention: the "outside pressure" type, in which the original water is fed to the outside of hollow fibers, and the "inside pressure" type, in which the original water is fed to the inside of hollow fibers. Hereinafter, the description will be of an apparatus of the "outside pressure" type.

Figure 10:
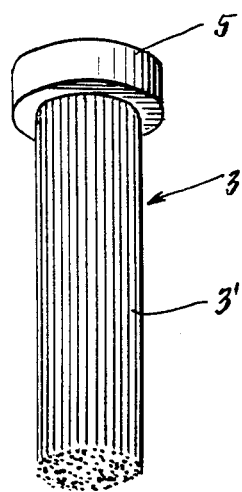
FIGS. 10 to 12 are perspective views of a bundle of hollow fibers where the upper portion is supported.
Figure 11:
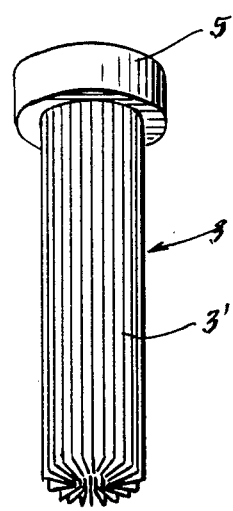
Figure 12:
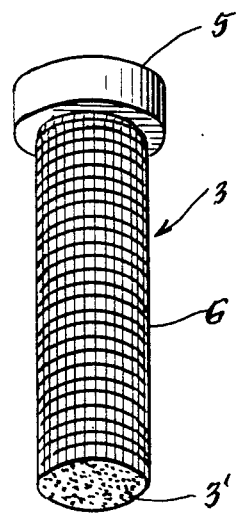
Figure 15:
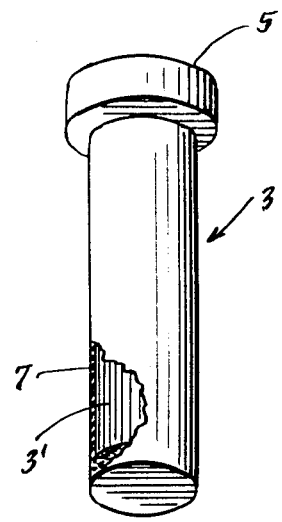
FIG. 15 is a perspective view of another bundle of hollow fibers of the upper portion-supported type.

As shown in FIGS. 1 to 9, an apparatus of the present invention consists of a tubular housing 1 having an upper portion which can be opened, a bundle of hollow fibers 3 inserted in housing 1, and a cover 2 mounted on the upper opening of housing 1. A collecting and fixing portion 5 of the bundle of hollow fibers 3, or a tubular cap member 4 fixedly connected with collecting and fixing portion 5 (generally a conical body with a head diameter smaller than that of collecting and fixing portion 5) is held in an opening formed in cover member 2. There are two ways to keep collecting and fixing portion 5 or tubular cap member 4 inserted into said opening: (1) the upper portion-supporting type, in which collecting and fixing portion 5 of bundle of hollow fibers 3 is supported by engaging it with housing 1 or cover member 2, and (2) the lower portion-supporting type, in which the section of hollow fibers extending from collecting and fixing portion 5 to a fixed portion 5' is supported by an independent member 6, and fixed portion 5' is supported by a supporting member 36 projecting from the lower portion of housing 1. The hollow fibers 3 are fixed with a cast-molding material at fixed portion 5' so that the opening formed at the lower end of said bundle of hollow fibers 3 is sealed. The upper end of the bundle of hollow fibers of the upper-portion supporting type, as shown in FIG. 10, is collected and fixed with a cast-molding material so that the upper end of each hollow fiber 3' is open. In an upper-portion supporting type structure, the lower end opening of a membrane of hollow fibers can be sealed closed with a cast-molding material, or, as shown in FIG. 11, the lower end of each hollow fiber 3' can be formed in a loop-like shape, wherein a cavity is formed within the bundle of hollow fibers if the lower ends of the hollow fibers formed in a loop-like shape are arranged in a ring. As a result the filtration efficiency is improved. The bundle of hollow fibers shown in FIG. 11 can effectively contain a large amount of hollow fibers in a small volume. In addition, since the original water passes through the central portion of a bundle of hollow fibers, scales can be very effectively prevented from adhering to hollow fibers, so that the life span of a membrane can be significantly extended and the water flux can be increased. There is also a type of bundle of hollow fibers, as shown in FIG. 12, in which the lower end is sealed, housed in an independent net-like or porous cylindrical member 6 made of a plastic or a metallic material. Another type of bundle of hollow fibers in which the lower end is sealed, as shown in FIG. 15, is housed in a porous protecting cylinder 7 made of a ceramic or plastic material, which effects the primary filtration.

Figure 13:
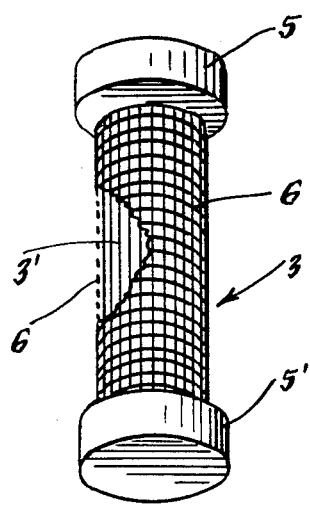
FIGS. 13 and 14 are perspective views of a bundle of hollow fibers where the lower portion is supported.

A bottom-supported type of bundle of hollow fibers is shown in FIG. 13, in which the upper and lower ends are fixed to an independent net-like or porous cylinder 6 with a cast-molding material. A membrane of hollow fibers opens at the upper end thereof and the lower-end opening is sealed with a cast-molding material. The entire bundle is housed in the independent net-like or porous cylinder 6.

Figure 14:
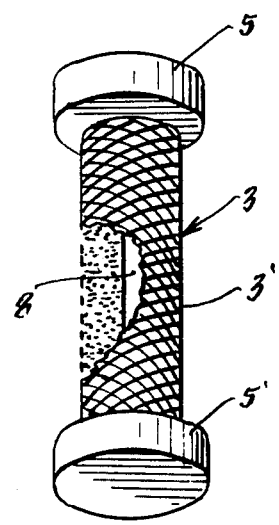

An alternate bundle of hollow fibers, as shown in FIG. 14, has its lower end fixed in a cast-molding material so as to be closed. A membrane of hollow fibers is collected and fixed at the upper end thereof, in which said membrane of hollow fibers 3' is wound cross-wise around an independent core 8.

Figure 16:
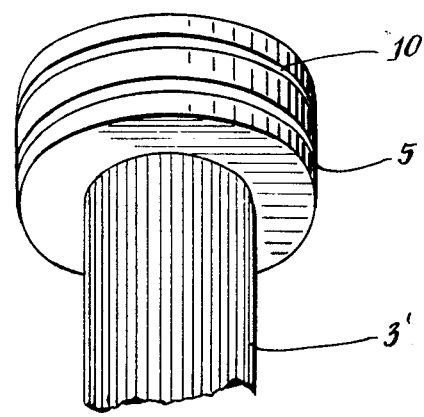
FIG. 16 is a perspective view showing a collecting and fixing portion of a bundle of hollow fibers.
Figure 17:
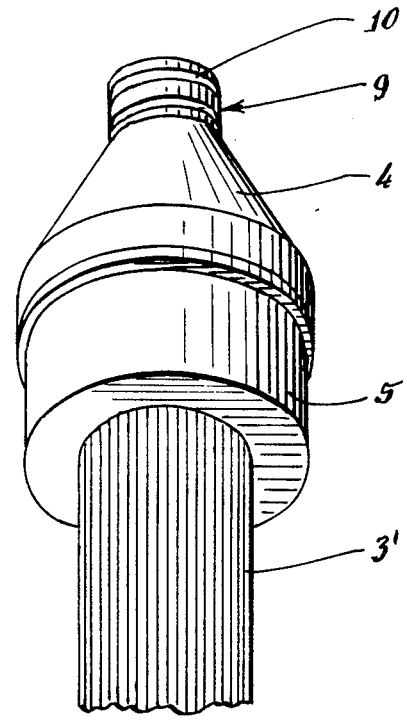
FIG. 17 is a perspective view of a tubular cap member.

In each of the hollow fiber bundles shown in FIGS. 10-15, a conical tubular cap member 4 may be fixed to the collecting and fixing portion 5 of the bundle of hollow fibers. In FIG. 16, a plurality of ring-like grooves 10 are formed on collecting and fixing portion 5. In FIG. 17, such grooves 10 are formed on the projecting portion 9 of a cap member 4. Cap member 4 is fixedly connected to the collecting and fixing portion 5 of a bundle of fibers. O-rings are placed in the ring-like grooves 10. Usually, two ring-like grooves are formed. But three or more ring-like grooves may be formed in order to create a more reliable mechanical seal.

Figure 1:
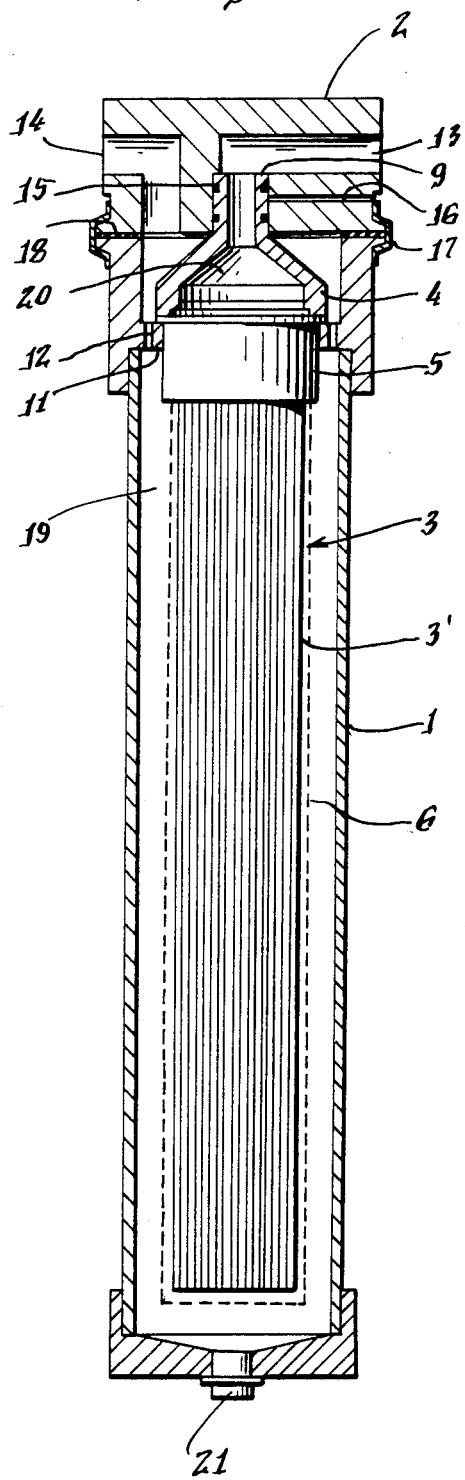
FIG. 1 is a sectional view of an apparatus in which the upper portion of a bundle of hollow fibers is provided with a tubular cap member so that the bundle can be supported.

FIG. 1 shows a preferred embodiment of a filtration apparatus in which a bundle of hollow fibers 3 of the upper portion-supported type is shown, and in which the conical cap member 4 is fixed to the collecting and fixing portion 5 with a cast-molding material.

The cylindrical housing 1, having an opening at its upper end, is provided with a flange 11 for supporting therewithin the collecting and fixing portion 5. Flange 11 is provided with a plurality of holes or notches 12. The collecting and fixing portion 5 as shown in FIGS. 10, 11, 12 or 15 is placed in housing 1 so that it is supported by said flange 11.

A cover member 2 mounted on the opening of housing 1 in a liquid tight manner is provided with an opening communicating with an outlet for the filtrate 13 at the center of the bottom wall thereof and an opening communicating with an inlet 14 for the original water adjacent to the opening communicating with the outlet for the filtrate 13. The opening communicating with the outlet 13 is connected with a filtrate-exhausting pipe (not shown), and the opening communicating with the inlet 14 is connected with an original water-introducing pipe. If necessary, the inlet 14 and the outlet 13 may be formed vertically on the upper wall or the side wall of the cover member 2. The protruding portion 9 of the conical cap member 4, connected with the collecting and fixing portion 5, is inserted into an opening communicating with the outlet 13, with the joint sealed by two O-rings 15. If the inlet for the original water and the outlet for the filtrate are reversed, this apparatus can be used for filtration by inside pressure.

In addition, an outlet 16 for leaking liquid is placed on the outside of the cover member 2 between the two O-rings 15. Reference numeral 17 designates a band coupling housing 1 with cover member 2 in a liquid-tight manner with a seal 18. Seal 18, O-ring 15, an original water-chamber 19, and a filtrate-chamber 20 form a liquid-tight structure with a wall membrane of hollow fibers between the original water-chamber 19 and the filtrate-chamber 20. That is to say, original water is introduced into the chamber 19, which is outside the hollow fibers, through an original water-introducing conduit. The components which can permeate the hollow fibers pass through the hollow fibers and are collected in the filtrate-chamber 20 via a passage formed inside the hollow fibers. They are then taken out through a filtrate-discharging conduit via the cap member 4. The components which cannot permeate the hollow fibers are discharged through an exhaust port 21 formed at the bottom of said housing 1.

Although there is a danger of the original water leaking into the filtrate side through the gap between the opening communicating with the filtrate-discharging conduit 13 and the protruding portion 9 of the cap 4, the gap is completely sealed by two O-rings. However, there is a danger of the original water leaking into the filtrate-chamber if the O-rings break and their sealing performance is spoiled. In the apparatus of the present invention, since the pressurized original water would be expelled from the apparatus via the outlet 16 for leaking liquid (formed on the cover member 2 and communicating with the outside environment), there is no possibility that original water could leak into filtrate-chamber 20. In addition, since the original water is flowing outside the apparatus from outlet 16, the leak can be discovered by the operator or a measuring apparatus.

In addition to the O-rings, a flat seal or the like can be used to seal the gap between the protruding portion 9 of cap 4 and the opening formed in the cover member 2. It is desirable to form an outlet such as outlet 16 for leaking liquid between each pair of adjacent O-rings when more than two O-rings are used. The particular seal broken in such an arrangement would be identifiable by noting which outlet for leaking liquid is active.

When the bundle of hollow fibers has deteriorated or become blocked in the manufacture of purified water, the original water is removed from the housing through the exhaust port 21 and then the band coupling 17 is removed to separate the cover member 2 from the housing 1, and the bundle of hollow fibers 3 is removed from the housing 1. Then, when the new bundle of hollow fibers has been put in the housing, the housing is reconnected with the cover member. Thus a bundle of hollow fibers can easily be exchanged. The apparatus described above, and shown in FIG. 1, is typically used with the cover member arranged on the top of the housing. However, it is often used turned upside down, depending on the place where it is located, in which case it is desirable that the exhaust port for original water remaining in the housing be installed as the input for original water.

Figure 2:
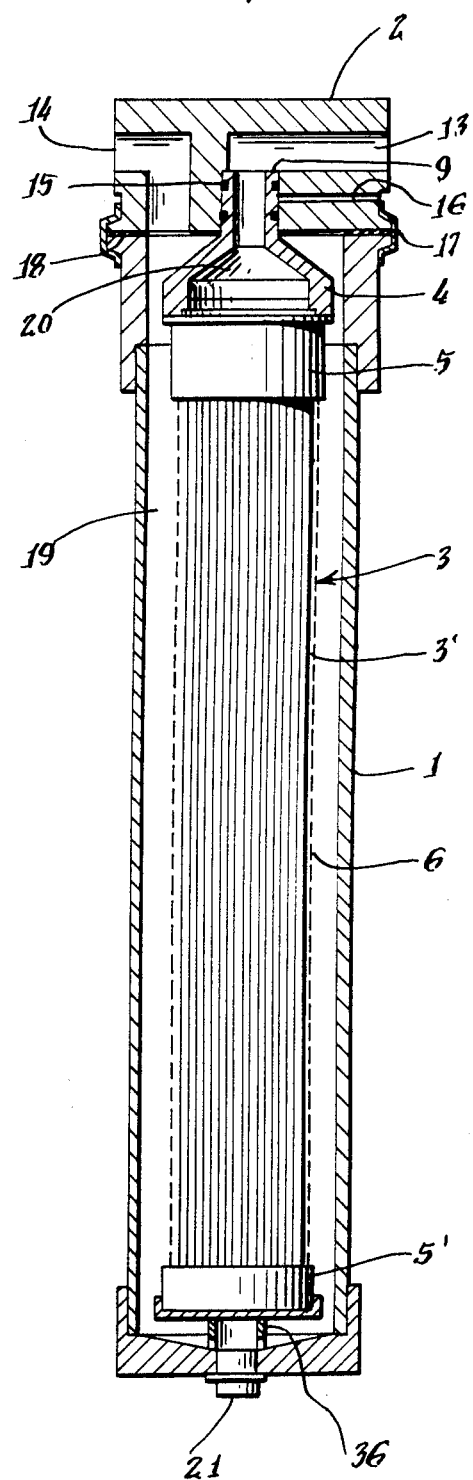
FIG. 2 is a sectional view of an apparatus in which the lower portion of a bundle of hollow fibers is provided with a tubular cap member for support.

Referring now to FIG. 2, an apparatus is shown which uses a lower-end supported bundle of hollow fibers 3 provided with a conical cap member 4. A fixing portion 5', which fixes the lower end of the hollow fibers in a cast-molding material, is placed on a supporting member 36 protruding from the lower portion of housing 1. A protruding portion 9 of the cap member 4 is mounted in an opening communicating with an outlet 13 for the filtrate formed on the bottom of cover member 2.

Figure 3:
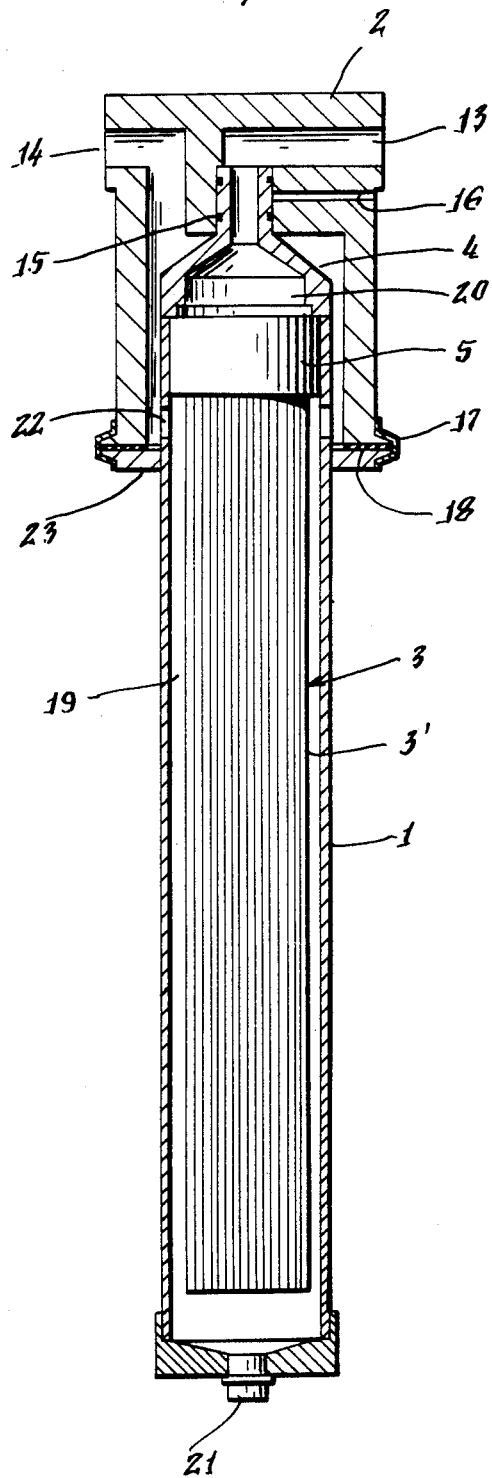
FIG. 3 is a sectional view of an apparatus in which a bundle of hollow fibers provided with a tubular cap members forms one body together with a housing.

Referring now to FIG. 3, a bundle of hollow fibers 3 is shown provided with a cap member 4 fixedly connected to a housing 1. Housing 1 is provided with a plurality of openings 22 at its upper end for introducing the original water, and a flange 23 for connecting housing 1 with cover member 2 at a position below openings 22. Original water, introduced into cover member 2 through an inlet 14, is fed to the inside of the housing 1 through the upper openings 22. In this apparatus, the housing 1 containing a bundle of hollow fibers 3 can be exchanged in its entirety when the hollow fibers deteriorate or become blocked.

Figure 4:
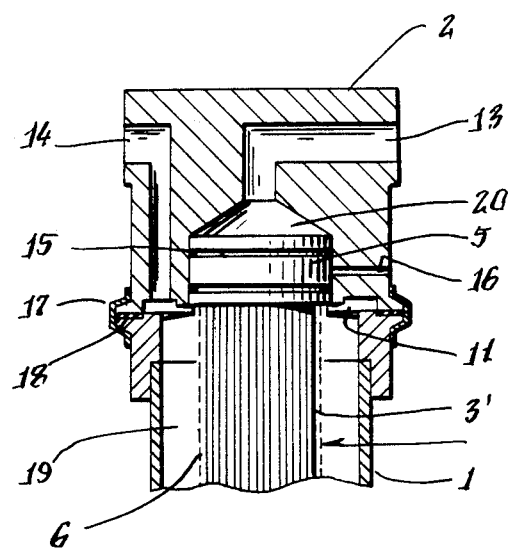
FIG. 4 is a sectional view of another apparatus in which the upper portion of a bundle of hollow fibers is supported.
Figure 5:
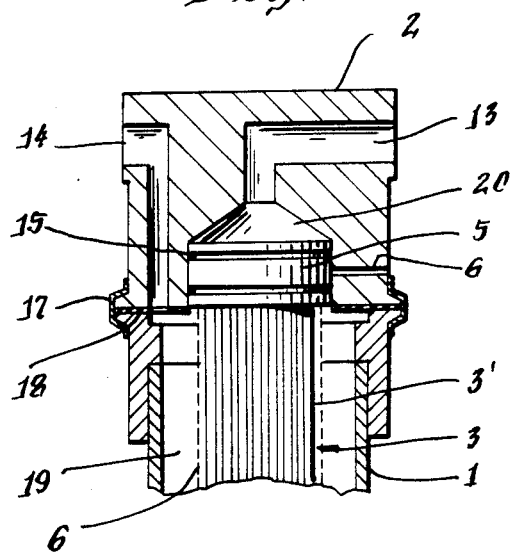
FIG. 5 is a sectional view of another apparatus in which the lower portion of a bundle of hollow fibers is supported.

FIG. 4 illustrates an apparatus containing an upper end-supported bundle of hollow fibers 3 and in which an O-ring 15 is put in a ring-like groove 10 formed on the outside surface of the collecting and fixing portion 5 of the bundle of hollow fibers 3. FIG. 5 illustrates an equivalent apparatus containing a lower end-supported bundle of hollow fibers. In FIGS. 4 and 5, the numbers mark the same parts as the numbers in FIGS. 1 and 2, and further description of them is not necessary.

Figure 6:
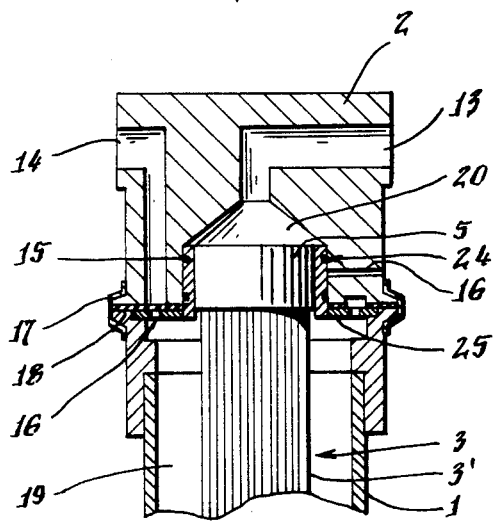
FIGS. 6 to 9 are sectional views of other apparatus in which the upper portion of a bundle of hollow fibers is supported.
Figure 8:
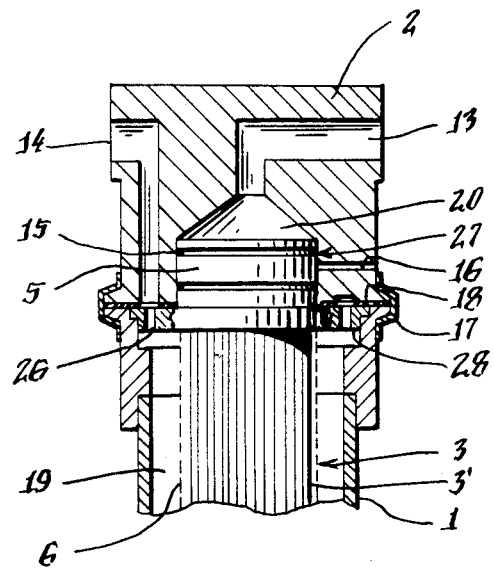
Figure 7:
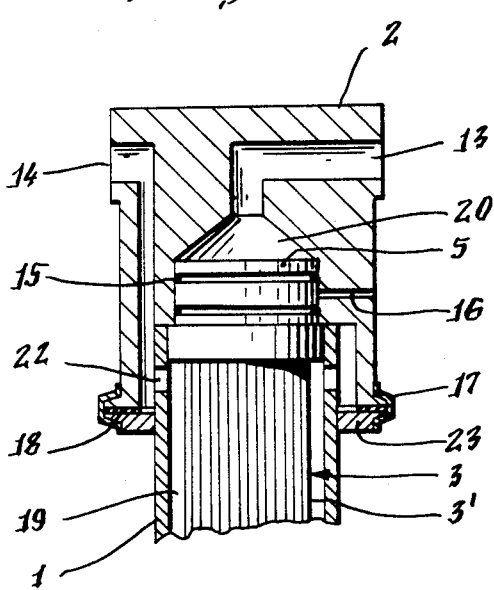

FIGS. 6–8 show apparatus in which a housing 1 is united with a bundle of hollow fibers. Referring to FIG. 6, a bundle of hollow fibers 3 is collected and fixed in an intermediate ring 24 provided with an O-ring 15. The intermediate ring 24 is united with a ring-like plate 25 fixedly connected with housing 1. The ring-like plate 25 is provided with an opening 26 corresponding to an opening communicating with an inlet for original water 14 formed in the bottom wall of a cover member 2. The apparatus of FIG. 7 corresponds to the apparatus of FIG. 3, the same places being marked in the same manner, and further description of the common elements is omitted.

FIG. 8 shows an apparatus containing a bundle of hollow fibers 3, in which the intermediate ring 24 and the ring-like plate 25 of FIG. 6 are united with a cast-molding material for collecting and fixing a bundle of hollow fibers. The bundle of hollow fibers is fixedly connected with the upper end of housing 1. A collecting and fixing portion 5 of the bundle of hollow fibers consists of a protruding portion 27 which is inserted into an opening formed in a cover member 2, and a ring-like portion 28 closing the end opening of said cover member 2. The ring-like portion 28 is provided with an opening 26 for introducing original water to housing 1 at a position corresponding to an opening communicating with inlet 14 for original water formed in the bottom wall of the cover member 2.

Figure 9:
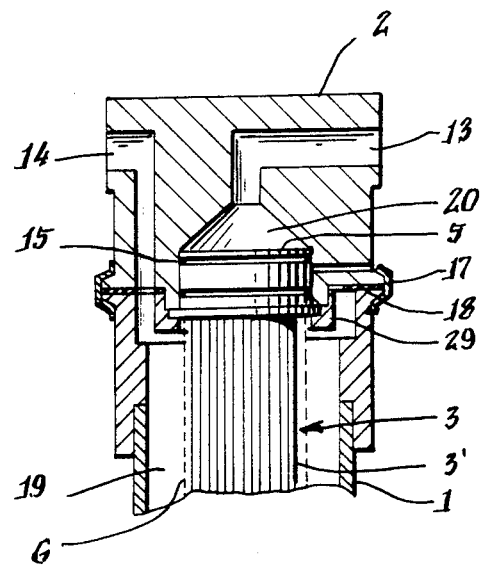

FIG. 9 shows an apparatus in which the cover member 2 is provided with screw threads and a collecting and fixing portion of a bundle of hollow fibers 3 is fixed to a cover member 2 by means of a nut 29. Various kinds of one-touch type connectors can be utilized instead of the above described thread and nut arrangement.

When an apparatus of the present invention is used to manufacture purified water, it is desirable that hollow fibers to be used have a high water-flux, for example of $1.5 \times 10^3$ m$^3$/m$^3$hr·kg/cm$^2$ or more, and to substantially prevent substances of 80 Å or more from permeating the fibers (referred to as a "rejection of ultrafiltration order").

Although in general, hollow fibers are characterized by water permeability per housing remarkably higher than that of a flat membrane, water permeability is preferably indicated in terms of the occupied volume $K_V$ (m$^3$/m$^3$·hr·kg/cm$^2$) rather than the water-flux $K_A$ (liter/m$^2$·hr·kg/cm$^2$, with respect to the area of a membrane of hollow fibers). If $K_V$ is used instead of $K_A$, the outside diameter and/or the inside diameter of the hollow fibers becomes a very important factor. For example, when $K_A$ is measured with respect to inside diameter, $K_V$ is in inverse proportion to the square of the outside diameter and in proportion to the inside diameter. In addition, when $K_A$ is measured with respect to the outside diameter, $K_V$ is in inverse proportion to the outside diameter. The inside diameter of a membrane of hollow fibers used in an apparatus of the present invention is 250 to 1,500μ, and preferably 300 to 1,000μ; the outside diameter thereof is 350 to 3,000μ, and preferably 400 to 2,000μ. At this time, a membrane of hollow fibers is superior in $K_V$ and pressure resistance. In addition, the balance of the other properties is improved.

The water permeability of hollow fibers is stated with respect to their occupied volume $K_V$, and determined as follows:

(i) A new bundle of membranes of hollow fibers is used, in which the membrane area is 200 cm² measured by the outside diameter, and which contains hollow fibers 20 cm long.

(ii) The water-flux (m³/hr×kg/cm²) $K_A$ is measured in a filtration process, in which pure water having a temperature of 25° C. is filtered at a pressure of 1 kg/cm² using an outside pressure total filtration method.

(iii) The occupied volume of the membranes of hollow fibers V is calculated by the following formula:

$$V = (\pi/4) D_o^2 lf,$$

where Do is the outside diameter of the membranes of the hollow fibers; l is the effective length of the membranes; and f is the number of hollow fibers.

The water-flux $K_V$ is then calculated by dividing the water-flux $K_A$, which was measured in (ii), by V.

The water-flux of a membrane of hollow fibers $K_V$ used in the manufacture of purified water is $1.5 \times 10^3$ m³/m³·hr·kg/cm², preferably $2.5 \times 10^3$ m³/m³·hr·kg/cm², and most preferably $3.5 \times 10^3$ m³/m³·hr·kg/cm² or more.

$K_V$ being large means that the required water permeability can be achieved by means of a more compact filtration apparatus. A membrane of hollow fibers having a $K_V$ of $30 \times 10^3$ m³/m³·hr·kg/cm² or more cannot be used in practice since only a small rejection coefficient R can be obtained under the present state of technology. In addition, substances of 80 Å or more do not substantially permeate through this membrane of hollow fibers. This holds true when the rejection coefficient R of colloidal silica, having an average particle diameter of 80 Å, is measured under the following conditions and R is 95% or more:

(i) Fibers: A bundle of hollow fibers is used in which the membrane area measured by the outside diameter is 200 cm², and which is 20 cm long.

(ii) Measuring solution: A 1% aqueous solution of colloidal silica having an averge particle diameter of 80 Å is used.

(iii) Filtrating conditions: Outside pressure total filtration method, filtration pressure of 0.5 kg/cm² and temperture of 25° C. is used. Water is mostly removed from a bundle of hollow fibers prior to the use thereof and also the inside of the wall of a membrane of hollow fibers is filled with a solution of colloidal silica and then the filtration is started by applying pressure.

(iv) Sampling: The original water is sampled directly before applying pressure and five samples sampled every 10 c.c. from the initial flow of a filtrate obtained by applying pressure are used. These six samples are dried for 16 hours at 100° C. and the concentration of solid fraction is measured.

(v) Calculation of rejection coefficient R: R is calculated from the following formula on the basis of the concentration of solids contained in the original water $C_D$ and the largest concentration of solids contained in the five samples taken from the filtrate $C_{Fmax}$:

$$R = (1 - C_{Fmax}/C_D) \times 100.$$

If a colloidal solution is used with this measuring method, even if a value for R of 97% is obtained, it does not mean that 3% of the particles with an average particle diameter of 80 Å permeated through the bundle of hollow fibers. If R is 95% or more, it can be assumed that no particles having diameters of 80 Å or more permeated through the bundle of hollow fibers.

Hollow fibers showing such rejection coefficients can substantially reject γ-globulin contained in bovine serum which is globular protein having a molecular weight of 160,000. Further, they can completely reject not only all bacteria and viruses but also lipopolysaccharide which is a secretion of bacteria and called pyrogene.

In addition, it is preferable that such hollow fibers have a compaction index of 0.2 or less. The compaction index $\alpha$ is expressed by the following formula:

$$\alpha = 1 - K_{V4}/K_{V1},$$

where
$K_{V1}$ = the water-flux (m³/m³·hr·kg/cm²) of water at 100° C. at a filtration pressure of 1 kg/cm² done by the outside pressure type filtration method; and $K_{V4}$ = the water-flux (m³/m³·hr·kg/cm²) of water at 100° C. at a filtration pressure of 4 kg/cm² according to the outside pressure type filtration method.

A compaction index $\alpha$ of 0.2 or less, that is to say 0 to 0.2, means that the hollow fibers have superior pressure resistance, especially at high temperatures, and that the reduction in filtration speed is little. Accordingly, hollow fibers having $\alpha$ larger than 0.2 are undesirable.

In general, filtration is rarely carried out at 100° but rather at 10° to 60° C. Consequently, it is thought that the value of $\alpha$ at 100° C. has no meaning industrially. However, hollow fibers, which are not compacted during short-time operation at 10° to 60° C., are classified into those which compact gradually, whereby filtration speed is reduced over long-time operation, and those which are hardly compacted, whereby the flux is not reduced over long-time operation. The value of $\alpha$ for water at 100° C. is useful for evaluating differences in compactation of hollow fibers quickly.

A membrane of hollow fibers with the above performance shows high water-flux and high pressure resistance as well as high heat resistance, although its rejection is of an ultrafiltration order.

Although the materials well known for use as membranes of hollow fibers (such as polysulfones, polyacrylonitriles, various celluloses, for example cellulose acetate, polyamides, polycarbonates and polyvinylalcohols) can be used, polysulfones are preferable since they are superior in heat resistance, acid-proofness, alkali-proofness and oxidizing resistance. In addition, such a membrane can be regenerated by washing it with oxidizers, acids, alkalis and the like. Further, polysulfone membranes can be sterilized by an optional sterilizing method selected from heat sterilization and chemical sterilization by formalin, chlorine and the like.

Above all, a membrane of polysulfone hollow fibers, which has slit-like fine gaps having an average width of 500 Å or less on its inside surface, fine pores of an average diameter of 1,000 to 5,000 Å at the porosity of 10 to 80% in the outside surface thereof, an inside of fine porous structure, substantially rejecting substances having diameters of 80 Å or more, and having a water-flux of 1.5 m³/m³·hr·kg/cm² or more, is preferably used. Such a membrane of hollow fibers is superior not only in water-flux but also in the rejection of an ultrafiltration order. As a result, such a membrane can substantially reject pyrogene substances. Further, its compactation index is 0.2 or less, so it is remarkably superior in pressure resistance and heat resistance.

A membrane of polysulfone hollow fibers has slit-like fine gaps of an average width of 500 Å or less on its inside surface. "Slit-like fine gaps" are fine long gaps formed in the longitudinal direction of the fibers, and "average width" is the average value of short diameters of said fine gaps. The length of said fine gaps in the longitudinal direction of the fibers is three or more times, and preferably ten or more times the width of the slit. It is desirable that the distribution density of fine gaps in the inside surface of said membrane of polysulfone hollow fibers be uniform and as high as possible. In addition, if the width of the fine gaps is also as uniform as possible, the membrane of polysulfone hollow fibers will enjoy excellent rejection and pressure resistance. The average width of the fine gaps can be measured by means of a scanning electron microscope. Since the rejection becomes too great if the average width is larger than 500 Å, such an average width is undesirable. An average width of 80 to 500 Å, and in particular 100 to 200 Å, gives a yet better balanced combination of water-flux and rejection. A membrane of polysulfone hollow fibers, whose inside surface has a slit-like fine gap structure, gives a water-flux remarkably larger than that of a membrane of polysulfone hollow fibers whose inside surface has a circular fine pore structure.

In addition, a preferred membrane of polysulfone hollow fibers has fine pores with an average diameter of 1,000 to 5,000 Å at a porosity of 10 to 50% on the outside surface thereof. The average pore diameter described herein is expressed by the following formula:

$$\overline{D} = \sqrt{\frac{(D_i^2)^2 + \ldots + (D_n^2)^2}{D_{i2} + \ldots + D_n^2}},$$

wherein
D: average pore diameter,
$D_i$: measured diameter of the i-th fine pore, and
$D_n$: measured diameter of the n-th fine pore.

In the case when the fine pores have circular shapes, $D_i$ and $D_n$ designate measured diameters while in the case where the fine pores are not circular, they designate the diameters of circles having the same areas as said fine pores.

If the average diameter of the pores formed in the outside surface of a membrane of polysulfone hollow fibers is less than 1,000 Å, the water-flux becomes too low. An average pore diameter larger than 5,000 Å is undesirable since pressure resistance is apt to be reduced. In addition, with outside pressure type filtration, filtration cakes deposited on the surface of the membrane intrude into the inside of the membrane, accelerate the reduction of the water-flux, and the recovery of the membrane cannot be made sufficient even by back washing or chemical washing. Consequently, outside pressure type filtration is undesirable. An average pore diameter of 1,500 to 3,500 Å is best. Fine pores having diameters of 500 Å or less are not included in the calculation of the average pore diameter. Although it is desirable that fine pores formed in the outside surface of a membrane of hollow fibers have a uniform diameter, they may be non-uniform.

The porsity described herein designates the ratio of the total area of fine pores formed in the outside surface of the membrane to the area of said outside surface by percentage. If porosity is less than 10%, water-flux is reduced. If the porosity is larger than 80%, surface strength is reduced, and the membrane is apt to be damaged when handled. If the porosity is 30 to 60%, the membrane shows a well-balanced combination of permeability and mechanical performance.

The inside of the membrane shows a fine porous structure. The fine porous structure described herein is a sponge structure such as a mesh structure, a honeycomb structure, or a fine gap structure. Although the inside surface, as well as the outside surface of a membrane, and the inside of a membrane may include a finger-like structure or a macrovoid structure, it is desirable not to have macrovoids of a size of 10μ or more substantially contained in them. A membrane of uniform sponge structure, in which macrovoids having a size of 10μ or more are not contained, is superior in strength, pressure resistance, and in particular in compactation resistance in a long-time operation.

The above described hollow fibers show superior filtration performance especially in the outside pressure type filtration method. For example, every microorganism can be removed from tap water by carefully filtering it through said hollow fibers by the outside pressure type filtration method. In addition, pyrogenous substances, which are secretions of microorganisms, can also be completely removed from tap water, and pyrogenic pure water can be easily obtained. Further, the water-flux of said membrane is apt to be remarkably high in comparison with that of conventional membranes for rejecting pyrogene. It is because removal of pyrogene and high water-flux can be simultaneously attained by means of a simple system, such as the outside pressure type filtration method, that the membrane of hollow fibers contains comparatively large fine pores in the outside surface thereof, a uniform inside sponge structure, and a skin layer of compact slit structure in the inside surface, whereby particles of submicron order or larger are caught in the outside surface and substances of submicron order or smaller, including dissolved polymer, are caught in the inside of the membrane or the inside surface thereof. Thus, since the outside surface and inside structure of the membrane serve as a prefilter, a water-flux remarkably larger than that attained by the conventional hollow fibers can be attained.

Polysulfone hollow fibers of the above-described structure can be manufactured from a spinning solution obtained by adding N, N'-dimethylformamide (hereinafter referred to as DMF) as a solvent and polyethylene glycol (hereinafter referred to as PEG) as an additive to polyarylsulfone. At this time, it is desirable that a large amount of additive such as PEG be added so that the spinning solution may produce micro phase-separation in sensitive response to a slight change of temperature or the introduction of a small amount of non-solvent such as moisture. In general, the spinning solution comprises polysulfone at a ratio of 12 to 25% by weight and PEG (molecular weight of 600) at a ratio of 20 to 45% by weight. The rest is DMF. Although the spinning solution of the above described composition is transparent at temperatures lower than a certain temperature, it produces whitening (phase separation) suddenly at temperatures higher than this certain temperature. Although in general the spinning solution having a phase-separation temperature of 10° to 70° C. is used, in order to obtain such a spinning solution at first the mixture consisting of polysulfone, PEG and DMF is stirred at 70° to 130° C. to produce whitened slurry and the resulting slurry is cooled to 0° to 70° C. while stirred to obtain a uniform transparent solution.

The resulting spinning solution is then degassed and filtered. After lowering the temperature of the spinning solution to a temperature 0° to 20° C. lower than the phase-separation temperature, it is subjected to a dry-wet spinning through a tube-in-orifice nozzle. It is desirable that the difference between the temperature of the spinning solution and the phase-separation temperature be less than 20° C. when the spinning solution is discharged through a nozzle. The internal solidifying solution is discharged through a needle of the tube-in-orifice nozzle in order to obtain hollow fibers. The structure of the inside surface of the hollow fibers is dependent upon the composition of the internal solidifying solution. It is desirable that a solidfying solution which can solidify the inside surface rapidly, such as water, be used in order to obtain a membrane structure of ultrafiltration order. The spinning solution is introduced into a dry zone through the tube-in-orifice nozzle. The structure of the outside surface of the hollow fibers is dependent upon the atmosphere (temperature, vapour pressure of solvents or non-solvents) and the length of the dry zone. It is desirable that the vapour pressure of non-solvents (for example, water) in the dry zone be increased and that the dry zone have such a length that the stay can be 0.1 seconds or more. In general, fresh humidified air is fed into the dry zone so that a humidity of 60% of more, preferably 90% or more, may be maintained therein. The micro phase-separation is produced on the outside surface of the hollow fibers (which were discharged through a nozzle) by the introduction of moisture into the nozzle in the vicinity of the dry zone, by controlling the atmosphere in the dry zone, and by controlling the length of the dry zone. The hollow fibers are then introduced into a solidifying solution where they are subjected to a rapid solidifying action, whereby a micro phase-separation structure is fixed. After removing solvents and additives from the hollow fibers with room temperature or hot water, they are treated with an aqueous solution of hydrophlic substances, such as glycerin, and dried.

Said hollow fibers are made up into a bundle to make an element. At this time, cast-molding materials such as polyurethane, silicone, and epoxy resin can be used as cast-molding materials for collecting and fixing one end of a bundle of hollow fibers. Not only the hollow fibers, but also the cast-molding materials must be heat and chemical resistant, especially for applications where heat resistance and chemical resistance are required. It is desirable that imidazolic hardened epoxy resins be used for such purposes. One end of a hollow fiber can be collected and fixed by filling the gap formed at the end portion of the hollow fiber with liquid epoxy compositions consisting of epoxy resin, polyamine hardeners which have an amine equivalent of 25 to 70 mol % of an epoxy equivalent, and imidazolic hardeners of 0.5 to 10% by weight to epoxy resin, in which the ratio of polyamine hardeners to imidazolic hardeners is 100:50 to 100:1, fixing at 0° to 50° C., and then curing at 60° to 150° C.

A housing and a cover for containing the bundle of hollow fibers therein is made of corrosion proof metal (such as stainless steel) and/or resins. Generally, resins are used. Heat resistant resins such as polypropylene, polytetrafluoroethylene, polyvinylidene fluoride, polyacetal, polycarbonate, polysulfone and poly-4-methylpentene-1 are preferable. All in all, polysulfone is most preferable due to its high heat resistance and modulus of bending elasticity. Non-heat resisting resins such as vinyl chloride, polystyrene and polyacrylonitril may be used in an apparatus operated at temperatures of 50° C. or less.

In addition, industrial rubbers such as silicone rubber are used for seals.

According to an apparatus of the present invention, the filtration pressure applied to the original water is 0.1 $kg/cm^2$ or more, preferably 0.2–0.3 $kg/cm^2$. Although the water-flux increases with an increase of the upper limit of said filtration pressure, it goes without saying that the pressure must be selected so that hollow fibers are not broken. In general, it is 5 $kg/cm^2$ or less, preferably 3 $kg/cm^2$ or less. It is undesirable that the original water be continuously filtered at high pressure from the start since filter cakes compact and accumulate, and total filtration capacity is reduced. Accordingly, it is desirable that the filtration be carried out at lower pressures at the start and the pressure be gradually increased as blocking occurs. When tap water is filtered, very pure water can be easily and very economically produced without using any pump, by directly connecting an apparatus of the present invention with the waterworks and relying on the water pressure supplied.

It is better if the original water fed into an apparatus of the present invention for the manufacture of purified water contains cakes (filter cakes having sizes of 80 Å or more and accumulated on the surfaces of a membrane of hollow fibers) whose properties resemble those of non-compressible cakes. "Non-compressible cakes" are cakes whose shapes are difficult to change when compressed by the filtration pressure. With these, water can easily permeate through a layer of cakes. For example, cakes of inorganic substances such as colloidal iron and silica, cross-linked polymer pieces such as ion-exchange resin pieces, activated carbon and the like are comparatively non-compressible. On the other hand, polysaccharides secreted from microorganisms, denatured protein and the like are not good since they compress to form gel-like cakes which water can barely permeate.

Even when non-compressible cakes are mixed with compressible cakes, they can be filtered out according to the present invention if the non-compressible cakes are dominant. Excessively high concentrations of cakes are detrimental because it is necessary to frequently exhaust the concentrated slurry, back wash, apply chemical washing or the like on account of the rapid accumulation of cakes.

"Original water" includes ultra pure water, pure water, tap water, river water, industrial water, sea water and the like. Ultra pure water can be obtained if an apparatus of the present invention is used as a check filter in the manufacture of ultra pure water. It is frequently desired to feed river water, industrial water and sea water to an apparatus of the present invention after being subjected to a preliminary treatment such as flocculating sedimentation, treatment by a sand filter or treatment by a cartridge filter of micron order.

EXAMPLE

The mixture consisting of polysulfone (Udel P-1700 manufactured by UCC) of 20 parts by weight, polyethylene glycol having a molecular weight of 600 (PEG #600 manufactured by Sanyo Kasei Co., Ltd.) of 36 parts by weight (PEG #600 is added at a ratio of 180% by weight based on polysulfone) and DMF of 44 parts by weight is heated at 120° C. while being stirred to obtain a slurry-like solution containing whitened phase-separations. The resulting slurry-like solution is cooled to 25° C. while being stirred to obtain a uniform transparent solution. This solution produces whitened phase-separations at temperatures higher than 36° C.

The resulting uniform transparent solution is degassed by standing overnight and a spinning is obtained. The resulting spinning solution is subjected to a dry-wet spinning by means of a tube-in-orifice nozzle having 18 holes and an internal solidifying solution is injected. At this time, the temperature of the spinning solution is 31° C., the length of a dry zone being 10 cm, the temperature of the atmosphere in said dry zone being 25° C., the relative humidity of the atmosphere in said dry zone being 100% and the temperature of the water, which is the external solidifying solution, being 20° C. Then the resulting hollow fibers are washed with water and wound around a flat frame of 1.2 m and subsequently immersed in water at 100° C. for two hours to remove polyethylene glycol. The fibers are simultaneously subjected to a heat treatment.

The membrane of hollow fibers thus obtained has an outside diameter of 750µ and an inside diameter of 500µ. It is found from the observation of the surfaces and the section of a membrane of hollow fibers by means of a scanning electron microscope (SEM) that micro pores having an average diameter of 0.3µ are formed in the outside surface of the membrane of hollow fibers at a porosity of 49%, slit-like gaps having an average width of 0.01µ are formed in the inside surface of the membrane of hollow fibers, macrovoids of 10µ or more are not formed at all in the inside and outside surfaces of the membrane of hollow fibers, nor in the inside of the membrane of hollow fibers, and the inside of the membrane of hollow fibers shows a uniform mesh-like sponge structure. The water-flux $K_V$ of pure water at 25° C. is $4.4 \times 10^3$ m$^3$/m$^3$·hr·kg/cm$^2$ which is an excellent value. In addition, the membrane of hollow fibers shows rejection of 98% or more for 0.1%-aqueous solution of bovine serum alubumin and a rejection of 99% or more for 0.1% - aqueous solution of standard polyethylene oxide having a molecular weight of 300,000 (SE - 150 manufactured by Toyo Soda Co., Ltd.). Furthermore, the compactation index $\alpha$ measured by an outside pressure water-permeability measuring method at 100° C., and an outside pressure of 1 kg/cm$^2$ as well as 4 kg/cm$^2$, is 0.15 which is an excellent value.

3,000 filaments of said hollow fiber are joined into a bundle. The one end of hollow fibers is sealed with a cast-molding material to obtain a bundle of hollow fibers 50 cm long, as shown in FIG. 10. The bundle of hollow fibers is installed in a housing to form an apparatus as shown in FIG. 4. The assembled apparatus and a hose connected to an outlet for filtrate are sterilized and pyrogene is decomposed by immersion in a 3% - aqueous solution of hydrogen peroxide overnight. Then the apparatus is connected to a faucet of tap water. Tap water is directly filtered in accordance with an outside pressure total filtration method without any preliminary treatments. The filtration is continuously carried out for 32 days at a filtration pressure of 1 kg/cm$^2$. Filtrates sampled after one hour, one day, 3 days, 7 days, 14 days, 21 days, 32 days, and 49 days, respectively, from the start of filtration are given the Limulus test. All samples show a result of "—". For reference, the tap water itself is given the Limulus test. All of the results are "++". Accordingly pyrogenic free water can be easily obtained by means of a membrane of hollow fibers according to the present invention. The filtration speed is $2.3 \times 10^3$ m$^3$/m$^3$·hr on the average. Thus, according to the present invention, a considerable amount of pyrogenic free water can be continuously obtained by means of a remarkably small module without any preliminary treatments and other systems such as pumps.

What is claimed is:

1. A filtration apparatus using a membrane of hollow fibers therein, comprising:
    a bundle of hollow fibers collected and fixed at one end thereof with an adhesive, and closed at the other end thereof;
    a hollow frustrum-shaped cap member coupled at the wide, base portion thereof to the collected and fixed end of said bundle;
    a tubular projection extending from the narrow, top portion of said cap member;
    a housing provided with an opening at its upper end for receiving the bundle of hollow fibers therein;
    flange means on the inner wall of said housing for engaging the base portion of said cap member, thereby supporting the hollow fiber bundle;
    a removable cover member for closing the upper end opening of said housing in a liquid-tight manner;
    a first opening in said cover member providing a fluid path between the interior and the exterior of said housing;
    a second opening in said cover member in communication with said tubular projection for providing a fluid path from the interior of said cap member to the exterior of said housing;
    at least two spaced seals extending around the circumference of said tubular projection for preventing direct communication between said second opening and the interior of said housing;
    a leakage opening in said cover member between said spaced seals for leading any liquid leaking across one of said seals to the outside of said housing; and
    means for coupling one of said first and second openings to an inlet for liquid to be treated and the other of said openings to an outlet for liquid to be treated.

2. A filtration apparatus as set forth in claim 1, in which said bundle of hollow fibers has a structure in which a plurality of membranes of hollow fibers form loops at one end thereof and said loops are arranged in a ring-like shape at the end portion thereof.

3. A filtration apparatus as set forth in claim 1, in which said seals are O-rings in ring-shaped grooves formed in said tubular projection.

4. A filtration apparatus as set forth in claim 1, in which said inlet for liquid to be treated and said outlet for treated liquid are symmetrically arranged in the side wall of said cover member.

5. A filtration apparatus as set forth in claim 1, in which substances of 80 Å or more do not substantially permeate said membrane of hollow fibers and where said membrane shows a pure water-permeating speed of $1.5 \times 10^3$ m$^3$/m$^3$·hr·kg/cm$^2$ or more.

6. A filtration apparatus as set forth in claim 5, in which said membrane of hollow fibers is made of polysulfone and has a structure such that slit-like fine gaps having an average width of 500 Å or less are formed in the inside surface thereof, fine pores having an average diameter of 1,000 to 5,000 Å at a porosity of 10 to 80% are formed in the outside surface thereof, and the inside thereof has a fine porous structure.

7. A filtration apparatus as set forth in claim 1 wherein said first opening is coupled to an inlet for liquid to be treated and said second opening is coupled to an outlet for liquid to be treated.

8. A filtration apparatus as set forth in claim 1 wherein said first opening is coupled to an outlet for liquid to be treated and said second opening is coupled to an inlet for liquid to be treated.

9. A filtration apparatus as set forth in claim 1 wherein said cover member includes a bottom wall with said second opening centrally located therein.

10. A filtration apparatus as set forth in claim 9 wherein said tubular projection is inserted into said second opening.

11. A method for producing purified water free of bacteria and pyrogene, comprising the steps of:

feeding unpurified water under a pressure of between about 0.1 to 5 kg/cm$^2$ into the inlet of an inline filtration apparatus having membranes of hollow fibers incorporated therein for the removal of bacterias and pyrogenes; and withdrawing purified water from the outlet of said in-line filtration apparatus, said filtration apparatus comprising:

a bundle of hollow fibers collected and fixed at one end thereof with a cast-molding material and closed at the other end thereof;

a cap member coupled to the collected and fixed end of said bundle;

at least two spaced seals installed about the circumference of said cap member;

a housing provided with an opening at the upper end thereof for receiving the bundle of hollow fibers therein, a removable cover member for closing the upper end opening of said housing in a liquid-tight manner, two openings in said cover member, one communicating with an inlet for liquid to be treated and the other communicating with an outlet for treated liquid, means for mounting said cap member into one of said two openings, and a leakage opening in said cover member between said seals for leading any liquid leaking across one of said seals to the outside of said apparatus.

* * * * *

UNITED STATES PATENT AND TRADEMARK OFFICE
CERTIFICATE OF CORRECTION

PATENT NO. : 4,547,289

DATED : October 15, 1985

INVENTOR(S) : Yoshihiro Okano et al

It is certified that error appears in the above-identified patent and that said Letters Patent is hereby corrected as shown below:

On the Title Page, at item [73] the assignee should read:

--Kuraray Co., Ltd., 1621 Sakazu, Kurashiki, Japan--

Signed and Sealed this

Twenty-second Day of April 1986

[SEAL]

Attest:

DONALD J. QUIGG

Attesting Officer

Commissioner of Patents and Trademarks